(12) United States Patent
Beck et al.

(10) Patent No.: US 11,645,960 B2
(45) Date of Patent: May 9, 2023

(54) DISTORTION CORRECTION FOR NON-FLAT DISPLAY SURFACE

(71) Applicant: Lenovo (Singapore) Pte. Ltd., Singapore (SG)

(72) Inventors: Kevin W Beck, Raleigh, NC (US); Russell Speight VanBlon, Raleigh, NC (US); Thorsten Stremlau, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/344,218

(22) Filed: Jun. 10, 2021

(65) Prior Publication Data

US 2022/0398957 A1    Dec. 15, 2022

(51) Int. Cl.
*G09G 3/00* (2006.01)
*G06T 3/00* (2006.01)
*G06T 19/00* (2011.01)
*G06F 3/01* (2006.01)

(52) U.S. Cl.
CPC ............. *G09G 3/035* (2020.08); *G06F 3/013* (2013.01); *G06T 3/005* (2013.01); *G06T 19/00* (2013.01); *G09G 2354/00* (2013.01); *G09G 2360/144* (2013.01)

(58) Field of Classification Search
CPC ................................ G09G 3/035; G06F 3/013
See application file for complete search history.

(56) References Cited

U.S. PATENT DOCUMENTS

| 2015/0219902 A1* | 8/2015 | Kim | G06F 1/1652 345/8 |
| 2016/0034047 A1* | 2/2016 | Lee | G06F 3/013 345/156 |

* cited by examiner

*Primary Examiner* — Shivang I Patel
(74) *Attorney, Agent, or Firm* — Ference & Associates LLC

(57) ABSTRACT

One embodiment provides a method, including: identifying, using data obtained from at least one sensor associated with an information handling device, a multi-planar orientation of a non-flat display surface of the information handling device and a spatial orientation of the information handling device with respect to a user's gaze position; determining, using a processor and based on the identifying, a distortion of at least one object displayed on the non-flat display surface; and adjusting at least one aspect of the non-flat display surface to correct the distortion. Other aspects are described and claimed.

18 Claims, 4 Drawing Sheets

DISTORTION CORRECTION FOR NON-FLAT DISPLAY SURFACE

BACKGROUND

Advancements in display technology currently enable content to be displayed on a variety of different types of non-flat display surfaces, e.g., foldable or curved display screens, which may be optimized for use in several types of information handling devices ("devices"), such as laptop computers, smart phones, tablet devices, hybrid devices, and the like. The unique features of these displays provide users with an array of functional benefits (e.g., larger screen with smaller form factor, increased portability, improved multimedia capture, etc.). However, an inherent issue with many of these displays is that displayed content may be distorted in some way.

BRIEF SUMMARY

In summary, one aspect provides a method, including: identifying, using data obtained from at least one sensor associated with an information handling device, a multi-planar orientation of a non-flat display surface of the information handling device and a spatial orientation of the information handling device with respect to a user's gaze position; determining, using a processor and based on the identifying, a distortion of at least one object displayed on the non-flat display surface; and adjusting at least one aspect of the non-flat display surface to correct the distortion.

Another aspect provides an information handling device, including: a non-flat display surface; at least one sensor; a processor; a memory device that stores instructions executable by the processor to: identify, using data obtained from the at least one sensor, a multi-planar orientation of the non-flat display surface and a spatial orientation of the information handling device with respect to a user's gaze position; determine, based on the identifying, a distortion of at least one object displayed on the non-flat display surface; and adjust at least one aspect of the non-flat display surface to correct the distortion.

A further aspect provides a method, including: detecting, using one or more sensors of a head-mounted display device, display aspects associated with a non-flat display screen positioned in space; determining, based on the detecting, correction parameters for content displayed on the non-flat display screen from a perspective of the head-mounted display device; and correcting, based on the determined correction parameters, a distortion of the content from the perspective of the head-mounted display device, wherein the correcting comprises providing on the head-mounted display device an augmented overlay containing digital corrections to the content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
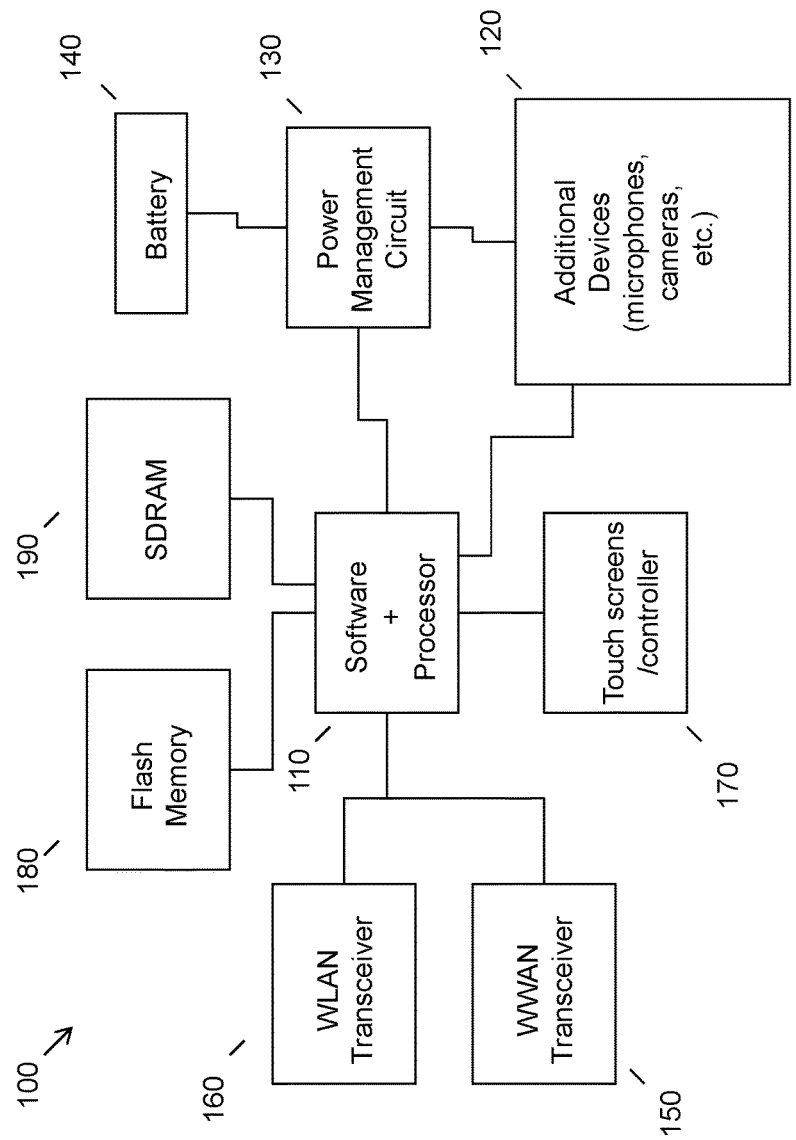
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Content (e.g., text, photos, videos, application windows, etc.) displayed on a non-flat display screen (e.g., a curved screen, a foldable screen, etc.) may become distorted when viewed from various perspectives. More particularly, the unique geometry of these screens may alter the appearance of content positioned around various folds, bumps, or curves of the screen. Common distortions may include differences in the geometry, brightness, color, etc., of content displayed between the two or more different screen planes (i.e., the two or more portions of the screen that are created when the screen is folded or curved), as well as in the folded or curved area of the screen.

Some conventional solutions exist to implement keystone corrections for various types of displayed content. For example, it is common for projectors to project an image onto an angled surface, whereby the image is distorted into a trapezoidal, rather than a rectangular, shape (e.g., content on one side of the image appears larger and is more in the foregoing than the opposite side of the image, etc.). High-end projectors may include software that may account for this keystoning effect and may correct the projected image so it appears substantially rectangular on the displayed surface. Similar techniques may also be employed by modern image editing software to correct an impact that this effect may have in captured images (e.g., where buildings appear to learn toward the vertical centerline of a photo when shooting upwards, where buildings appear to get broader toward the top when shooting downwards, etc.). However, neither of these conventional solutions are able to account for and correct the apparent distortions experienced by users of non-flat display screens in their specific viewing context.

Accordingly, an embodiment provides a method for dynamically correcting a distortion for an object displayed on a non-flat display surface. In an embodiment, a multi-planar orientation for a non-flat display screen of a device and a spatial orientation of the device with respect to a user's gaze position may be identified. An embodiment may then utilize this knowledge to determine a distortion of at least one object displayed on the non-flat display screen and thereafter adjust an aspect of the non-flat display surface to correct for this distortion. Such a method may therefore enable users to better visualize displayed content, regardless of the vantage point from which they view it.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
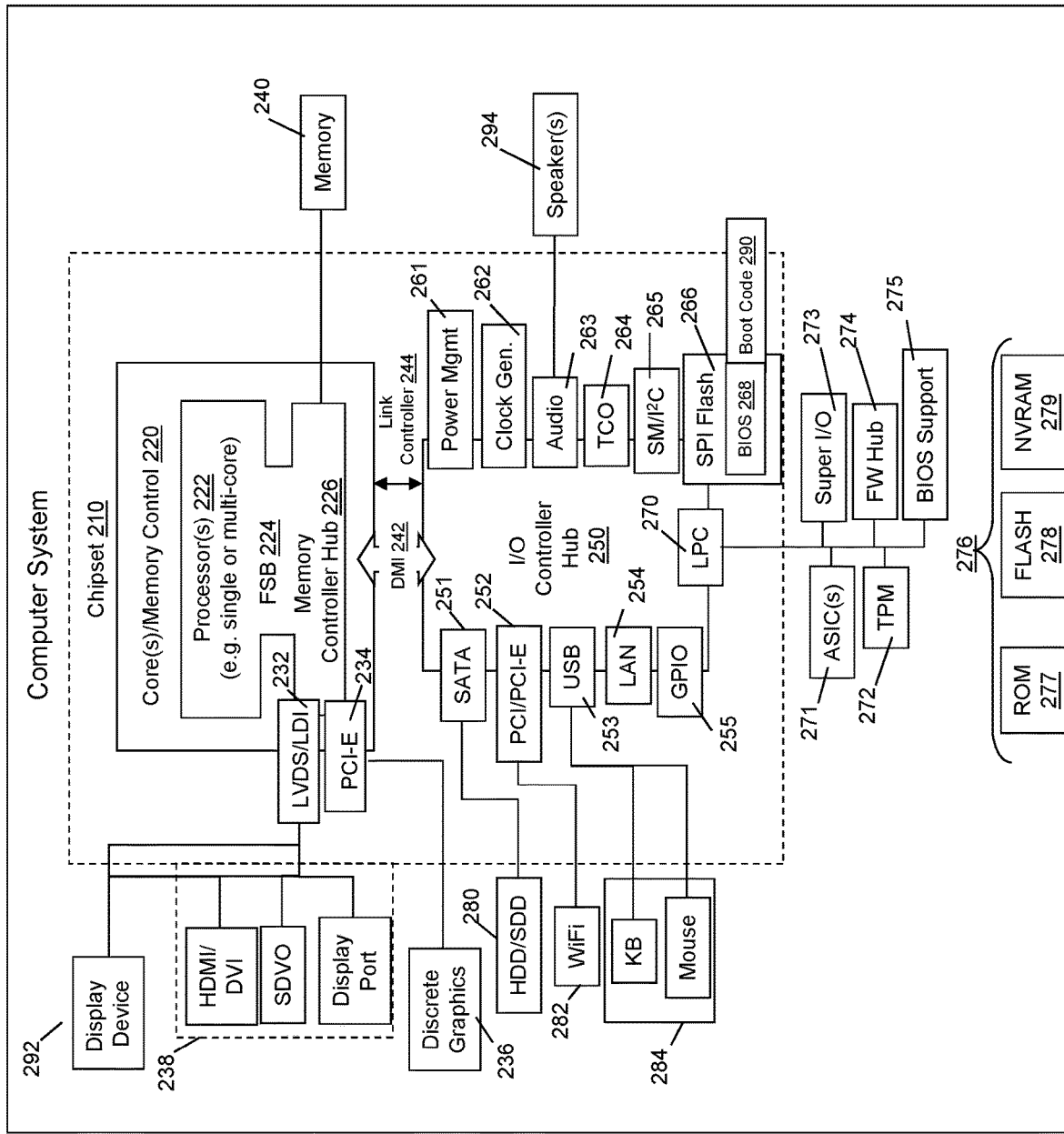
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that may be folded or manipulated and that can support a non-flat display screen. For example, the circuitry outlined in FIG. 1 may be implemented in a foldable phone or foldable tablet embodiment, whereas the circuitry outlined in FIG. 2 may be implemented in a laptop having foldable features.

Figure 3:
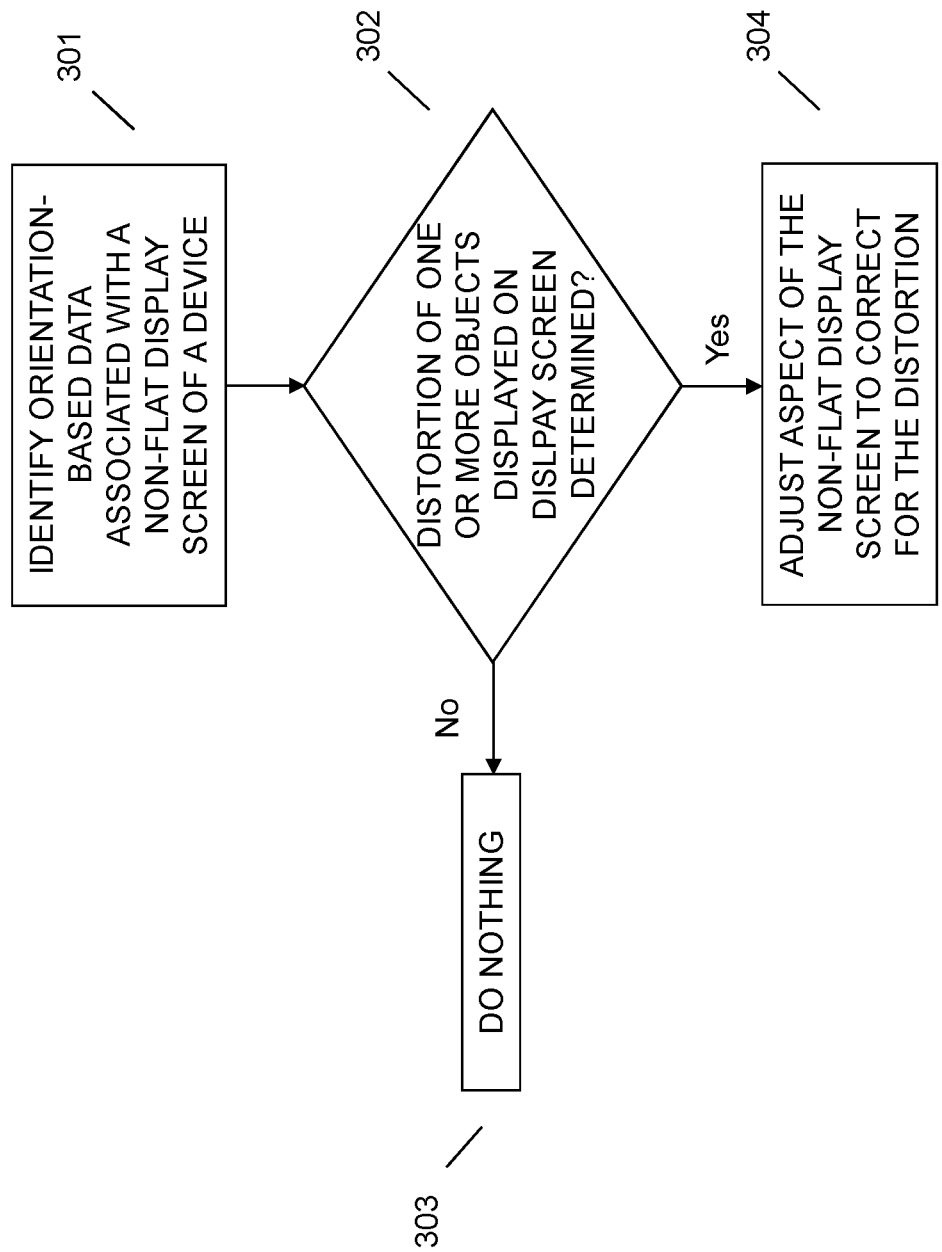
FIG. 3 illustrates an example method of correcting a distortion to an object displayed on a non-flat surface.

Referring now to FIG. 3, an embodiment provides a method of dynamically adjusting at least one aspect of a non-flat display screen to correct a distortion. At 301, an embodiment may identify orientation-based data associated with a device. In the context of this application, orientation-based data may refer to one or both of: a multi-planar orientation of a non-flat display screen of a device and a spatial orientation of the device with respect to the user's gaze position. Regarding the former, a multi-planar orientation of the non-flat display screen may correspond to an orientation that a particular device is positioned (e.g., how the display screen is angled, etc.), how aspects of the device or display screen are manipulated (e.g., what non-flat features does the display screen contain, etc.), and/or where certain components of the device are located (e.g., where sensors are embedded or positioned around the device, etc.). Regarding the latter, the spatial orientation of the device may correspond to a position and distance of the device relative to a user's eyes/gaze.

In the context of this application, a non-flat display surface may correspond to an electronic display screen that may be foldable (e.g., into two or more sections, etc.), curved, or be manipulated in some other way as to create multiple screen planes and/or angles of viewing (e.g., twisted, etc.). It is also important to note that while the balance of this application describes non-flat display screens resident on common electronic devices (e.g., smart phone, tablets, etc.), such designations are not limiting and the concepts described herein may be applicable to virtually any other type of non-flat display surface (e.g., on vehicle dashboards, on various household appliances, advertising displays such as billboards, etc.).

In an embodiment, the orientation-based data may be obtained by one or more sensors integrally or operatively coupled to the device (e.g., via a wired or wireless connection, etc.). For example, applicable sensor types may include an accelerometer, a magnetometer, a position-identifying sensor, a presence detecting sensor, an ambient light sensor, and a camera sensor (e.g., RGB camera, IR camera, etc.). The identification may be facilitated from data obtained from one sensor alone (e.g., an RGB camera, etc.) or a combination of two or more of the aforementioned sensor types (e.g., an ambient light sensor and a position-identifying sensor, etc.). Additionally or alternatively, one or more of these sensors may be always on or, conversely, may be activated in response to identification of a predetermined event (e.g., when a device or an application on the device is activated, when a human user is detected in proximity to the device, etc.).

At 302, an embodiment may determine whether a distortion exists from a viewer's perspective for at least one object displayed on the non-flat display screen. In an embodiment, a distortion may be identified for virtually any object that may be displayed on a display screen (e.g., a block of text, an image, a video, an application window, etc.). In an embodiment, the identified orientation-based data may be relied on to predict whether or not such a distortion is present. In an embodiment, the prediction may be facilitated by the construction and analysis of a dynamic, three-dimensional model of the device and its relationship with a viewing perspective of a user. Through this model, an embodiment may make predictions regarding where distortions on the display screen are likely to exist/occur for each viewing context.

With respect to the foregoing, the multi-planar orientation data may be utilized in the model construction process to identify the particular ways in which the non-flat display screen is manipulated (e.g., where the screen is curved, how extreme is the curve, what is the rotational angle between a top portion of a foldable device and a bottom portion of the foldable device, where on the foldable display screen is a fold located, etc.) Additionally, the spatial orientation data may enable the model to identify how a user is perceiving content displayed on the non-flat display screen with respect to the distance the device is from the user and a viewing angle of the user with respect to the non-flat display screen. Additional types of sensor data, if available, may also be considered to improve the model and to better allow a system to predict where the distortions occur. For example, ambient light intensity and/or color data may also (e.g., one plane of a foldable device may be a brighter color than the other, a crease area of a foldable screen may have a greater color intensity than the other portions of the foldable screen, etc.).

Responsive to determining, at 302, that no distortion exists for any object displayed on the non-flat display surface, an embodiment may, at 303, take no additional action. Conversely, responsive to determining, at 302, that a distortion exists for an object displayed on the non-flat display screen, an embodiment may, at 304, adjust one or more aspects of the non-flat display screen to correct the distortion. In an embodiment, the adjustments may be made automatically (i.e., without any additional manual user input). Further details regarding the various types of adjustments that may be made are expounded upon in the paragraphs below.

As used herein, adjustment to an aspect of the non-flat display screen may correspond to an adjustment made to a characteristic of the non-flat display screen itself and/or an adjustment made to the distorted object. Regarding the former, portions of the display screen may be recolored, brightened, darkened, etc. For example, in a situation where one plane of a foldable device is brighter than another, an embodiment may dynamically darken or brighten one or both of the planes to create a consistent coloring throughout the display. As another example, in a situation where a crease area of a foldable display is very intense with respect to other portions of the display, an embodiment may decrease the intensity of this crease area to create a consistent intensity throughout the display. Regarding the latter, a conventional keystone correction may be implemented on the distorted object (e.g., making the object appear rectangular, etc.) and/or the distorted object may be repositioned, resized, recolored, reshaped, sharpened, and the like. For example, given a display screen folded into two substantially equal portions (e.g., where the crease runs vertically through the screen from top to bottom), text occupying an entirety of the display screen may be initially skewed. More particularly, text at the outer edges of the display screen may appear much larger than the text present in the middle of the display screen where the fold is. Embodiments of the application may identify and correct for these skewed dimensional characteristics by, for example, adjusting the text to appear substantially rectangular on each of side of the fold.

Using the foregoing techniques, embodiments of the underlying application are able to make on-the-fly adjustments to a non-flat display screen. More particularly, a user's perspective with respect to a non-flat display screen may frequently change during the course of their interaction with the device (e.g., as they adjust an angle between an upper and lower portion of the screen, as they transition from a seated position to a laying position or vice versa, etc.). Accordingly, an embodiment may identify the distortions associated with each new viewing context and thereafter automatically implement the necessary adjustments to the non-flat display screen to account for these distortions. Such embodiments may solve for incremental rotations of a display screen to keep displayed contents in substantially the same plane as the user's gaze, regardless of the user's viewing context (i.e., regardless of the angle of the display relative to the user's eyes).

Figure 4:
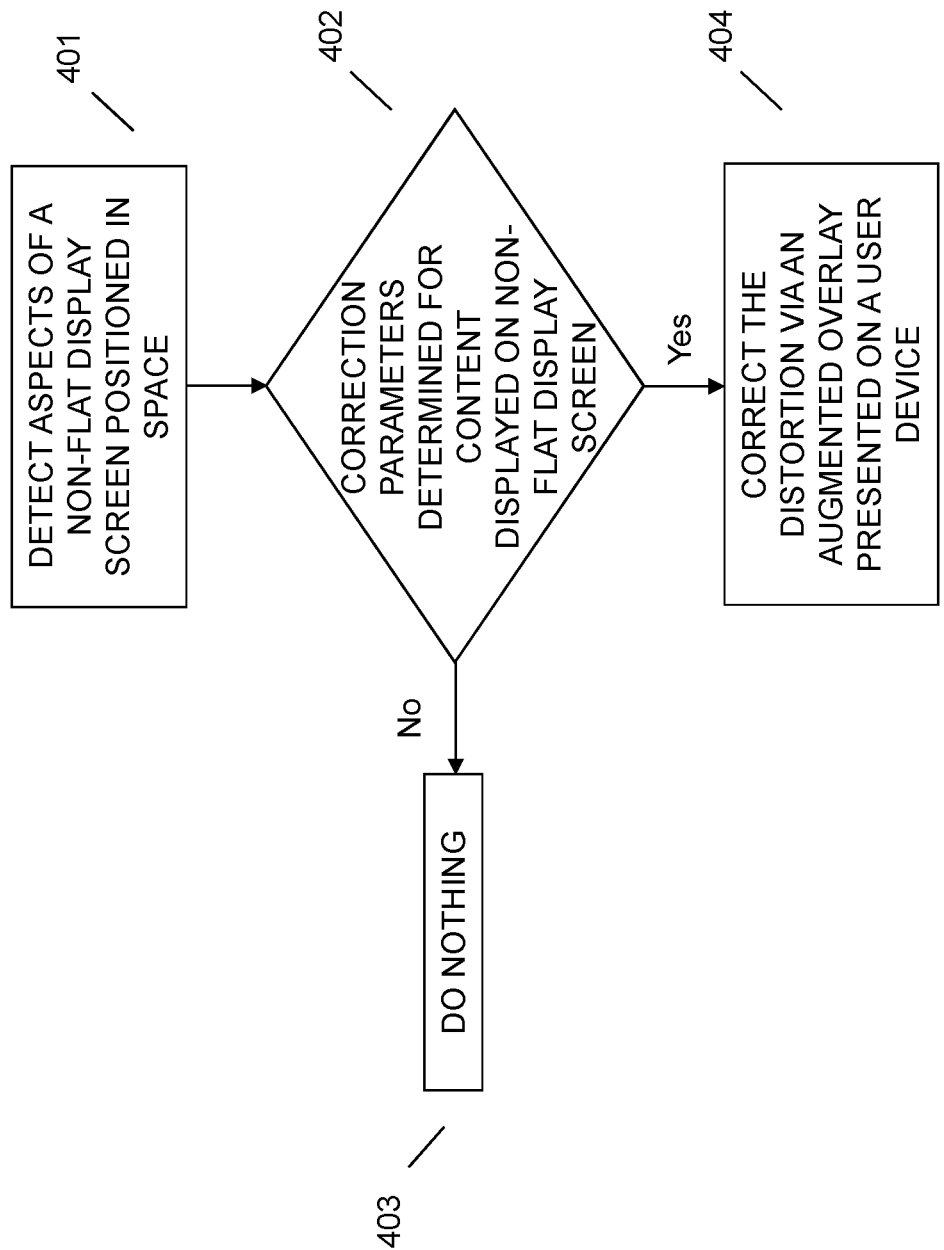
FIG. 4 illustrates an example method of instituting augmented corrections on a user's device.

Referring now to FIG. 4, an embodiment provides a method of instituting augmented corrections on a user's device to correct for distortions present on a non-flat display screen. At 401, an embodiment may detect various aspects or characteristics of a non-flat display positioned at a point in space. Relevant aspects that an embodiment may detect include a height of the display with respect to the user, a nature of the non-flat properties of the display (e.g., is the display curved, folded, twisted, etc.), identifiable distortions present on the non-flat display (e.g., keystoning of the displayed content, inconsistency in brightness or color throughout the display, etc.). In an embodiment, these aspects may be detected by one or more sensors (e.g., camera sensors, etc.) integrated into a user's device. In an embodiment, the user's device may be virtually any device capable of projecting augmented images onto a display screen of the device. For simplicity purposes, the remainder of the discussion with respect to FIG. 4 will be conducted with reference to a head-mounted display ("HMD") that contains a display screen substantially positioned in front of a user's eyes. The display screen of the HMD may be a conventionally flat display screen or, alternatively, may also have non-flat characteristics. It is important to note that the designation of the HMD is not limiting and that the concepts described herein may be applicable to other devices capable of implementing augmented overlays (e.g., smart phones, tablets, etc.).

At 402, an embodiment may determine correction parameters for content displayed on the non-flat display screen from a perspective of the HMD. More particularly, an embodiment may first identify a viewing angle of the HMD to the non-flat display screen and/or may also identify a portion of the HMD that a user is viewing (e.g., facilitated by a gaze detection technique, etc.). An embodiment may then determine, based on the detected aspects associated with the display and based on the user's specific viewing perspective, one or more distortions perceived by the user with respect to the non-flat display screen and associated correction parameters for these distortions. As used herein, correction parameters may refer to corrections that may be implemented by the system to negate or address the identified distortions.

If no correction parameters are able to be determined, at 402, then an embodiment may, at 403, take no additional action. Conversely, if correction parameters are able to be determined, at 402, then an embodiment may correct, at 404, distortions of the displayed content via provision of an augmented overlay on the HMD. Specifically, an embodiment may utilize the determined correction parameters to implement augmented corrections for the non-flat display screen on the user's HMD. Such a method may allow a multitude of users, each with a different viewing perspective and each wearing an HMD, to view the same non-flat display screen in a corrected fashion (i.e., because user-specific correction parameters have been determined by each user's HMD).

As a non-limiting example of the foregoing concepts described in FIG. 4, a plurality of individuals may view an electronic billboard situated on the side of a building. The billboard may contain a display screen that is folded, which correspondingly affects the appearance of text positioned over the fold. More particularly, the crease of the fold may appear as a different color than the rest of the display screen and the text on each folded plane may be keystoned. These distortions may be identified by an HMD worn by each of the individuals. Additionally, based upon a viewing perspective of each of the individuals, correction parameters may be identified and an augmented overlay of corrections to these distortions may be implemented on each HMD. For instance, the augmented overlay may include an augmented darkening of the crease of the fold and/or a keystoning correction to the affected text.

The various embodiments described herein thus represent a technical improvement to conventional methods for correcting distortions occurring on a non-flat display screen. Using the techniques described herein, an embodiment may identify orientation-based data associated with a device, and more specifically, with how a non-flat display screen is oriented and viewed by a user of the device. An embodiment may then utilize this data to determine a distortion affecting at least one object displayed on the non-flat display screen and may thereafter implement one or more adjustments (e.g., to aspects and/or portions of the non-flat display screen, to aspects and/or portions of content display on the non-flat display screen, etc.) to correct the distortion. The basis of the foregoing concepts may also be applied in an augmented sense (i.e., a system of a user's device may implement augmented corrections to account for the distortions present on another device viewable by the user. Such a method may provide users a better viewing and interaction experience with non-flat display screens.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, using data obtained from at least one sensor associated with an information handling device, a multi-planar orientation of a non-flat display surface of the information handling device and a spatial orientation of the information handling device with respect to a gaze position of a user;
    determining, using a processor and based on the identifying, a distortion of at least one object displayed on the non-flat display surface caused by the gaze position of the user with respect to the non-flat display surface of the information handling device, wherein the determining the distortion comprises predicting whether the distortion exists by constructing a three-dimensional model of the information handling device in space and predicting, utilizing the three-dimensional model, where on the non-flat display screen distortion exists for a viewing context, wherein the constructing comprises identifying, utilizing the multi-planar orientation data, ways the non-flat display screen is manipulated and identifying, using the spatial orientation data, how the user is perceiving the at least one object; and
    adjusting at least one aspect of the non-flat display surface to correct the distortion.

2. The method of claim 1, wherein the at least one sensor is selected from the group consisting of: an accelerometer, a magnetometer, a position-identifying sensor, a presence detecting sensor, an ambient light sensor, and a camera sensor.

3. The method of claim 1, wherein the at least one object is selected from the group consisting of: an image, a text block, and an application window.

4. The method of claim 1, wherein the non-flat display surface is one of: a foldable display and a curved display.

5. The method of claim 4, wherein the non-flat display surface is the foldable display and wherein the adjusting the at least one aspect comprises adjusting a characteristic of the at least one object distorted by a folding area of the foldable display.

6. The method of claim 1, wherein the constructing comprises accessing, in an accessible data store, dimensional data, sensor position data, and operability data associated with the information handling device.

7. The method of claim 1, wherein the adjusting comprises automatically adjusting without receiving additional user input.

8. The method of claim 1, wherein the adjusting the at least one aspect comprises adjusting at least one of: a brightness of the non-flat display surface, an angle of the at least one object, a size of the at least one object, a sharpness of the at least one object, and a position of the at least one object.

9. The method of claim 1, further comprising:
    detecting adjustment input affecting the multi-planar orientation of the information handling device;
    identifying a new distortion of the at least one object based on the detected adjustment input; and
    automatically correcting the new distortion.

10. An information handling device, comprising:
    a non-flat display surface;
    at least one sensor;
    a processor;
    a memory device that stores instructions executable by the processor to:
    identify, using data obtained from the at least one sensor, a multi-planar orientation of the non-flat display surface and a spatial orientation of the information handling device with respect to a gaze position of a user;
    determine, based on the identifying, a distortion of at least one object displayed on the non-flat display surface caused by the gaze position of the user with respect to the non-flat display surface of the information handling device, wherein to determine the distortion comprises predicting whether the distortion exists by constructing a three-dimensional model of the information handling device in space and predicting, utilizing the three-dimensional model, where on the non-flat display screen distortion exists for a viewing context, wherein the constructing comprises identifying, utilizing the multi-planar orientation data, ways the non-flat display screen is manipulated and identifying, using the spatial orientation data, how the user is perceiving the at least one object; and
    adjust at least one aspect of the non-flat display surface to correct the distortion.

11. The information handling device of claim 10, wherein the at least one sensor is selected from the group consisting of: an accelerometer, a magnetometer, a position-identifying sensor, a presence detecting sensor, an ambient light sensor, and a camera sensor.

12. The information handling device of claim 10 wherein the at least one object is selected from the group consisting of: an image, a text block, and an application window.

13. The information handling device of claim 10, wherein the non-flat display surface is one of: a foldable display and a curved display.

14. The information handling device of claim 13, wherein the non-flat display surface is the foldable display and wherein the instructions executable by the processor to adjust the at least one aspect comprise instructions executable by the processor to adjust a characteristic of the at least one object distorted by a folding area of the foldable display.

15. The information handling device of claim 10, wherein the instructions executable by the processor to construct comprise instructions executable by the processor to access, in an accessible data store, dimensional data, sensor position data, and operability data associated with the information handling device.

16. The information handling device of claim 10, wherein the instructions executable by the processor to adjust the at least one aspect comprise instructions executable by the processor to adjust at least one of: a brightness of the non-flat display surface, an angle of the at least one object, a size of the at least one object, a sharpness of the at least one object, and a position of the at least one object.

17. The information handling device of claim 10, wherein the instructions are further executable by the processor to:
    detect adjustment input affecting the multi-planar orientation of the information handling device;
    identify a new distortion of the at least one object based on the detected adjustment input; and
    automatically correct the new distortion.

18. A method, comprising:
    detecting, using one or more sensors of a head-mounted display device, display aspects associated with a non-flat display screen positioned in space;
    determining, based on the detecting, correction parameters for content displayed on the non-flat display screen from a perspective of the head-mounted display device, wherein the determining comprises predicting whether a distortion exists by constructing a three-dimensional model of the head-mounted display device in space and predicting, utilizing the three-dimensional model, where on the non-flat display screen distortion exists for a viewing context, wherein the constructing comprises identifying, utilizing the multi-planar orientation data, ways the non-flat display screen is manipulated and identifying, using the spatial orientation data, how a user is perceiving the content; and
    correcting, based on the determined correction parameters, a distortion of the content from the perspective of the head-mounted display device, wherein the correcting comprises providing on the head-mounted display device an augmented overlay containing digital corrections to the content, wherein the distortion is caused by the gaze position of a user with respect to the head-mounted display device.

* * * * *